United States Patent [19]

Kaye

[11] 3,967,979
[45] July 6, 1976

[54] BATTERY AND CASE FOR APPLICATION IN RANDOM MODE TO SUPPLY PROPER POLARITY TO APPARATUS TO BE ENERGIZED

[75] Inventor: Gordon E. Kaye, Garrison, N.Y.

[73] Assignee: P. R. Mallory & Co. Inc., Indianapolis, Ind.

[22] Filed: Dec. 4, 1974

[21] Appl. No.: 529,310

[52] U.S. Cl.................................. 136/173; 136/166
[51] Int. Cl.² ........................................ H01M 1/02
[58] Field of Search............. 136/173, 166; 220/4 E; 206/2

[56] References Cited
UNITED STATES PATENTS

| | | | |
|---|---|---|---|
| 1,627,264 | 5/1927 | Baird | 136/173 |
| 2,590,804 | 3/1952 | Vitale | 136/173 |
| 2,988,588 | 6/1961 | Hartwig | 136/173 |
| 3,887,394 | 6/1975 | Kaye | 136/173 |

*Primary Examiner*—John H. Mack
*Assistant Examiner*—H. A. Feeley
*Attorney, Agent, or Firm*—Ronald S. Cornell; Israel Nissenbaum; Charles W. Hoffmann

[57] ABSTRACT

A battery case for containing several cells as a battery, and having battery terminals, within the case contour and accessible through windows, to be engaged by external receiving terminals of an apparatus to be served; with the battery terminals arranged to apply proper polarity, whether the case is applied right side up, or in inverted mode, at random.

11 Claims, 9 Drawing Figures

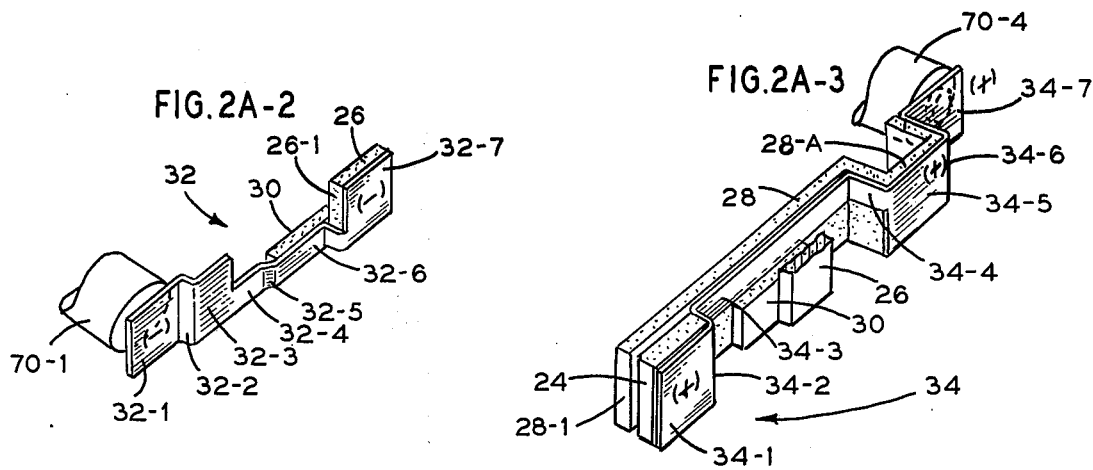
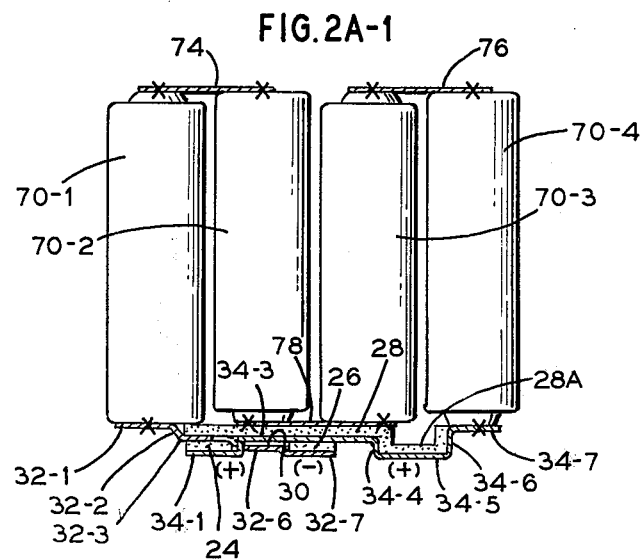
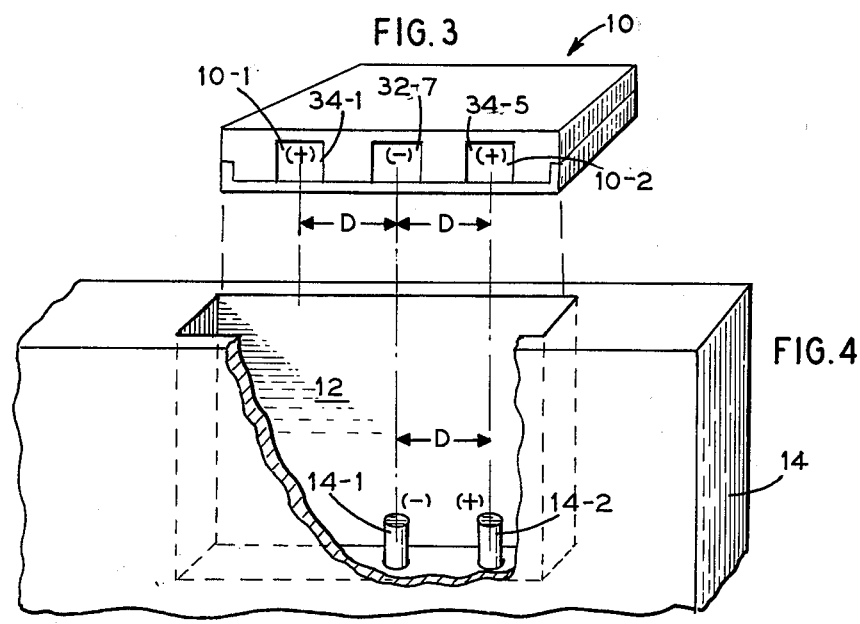

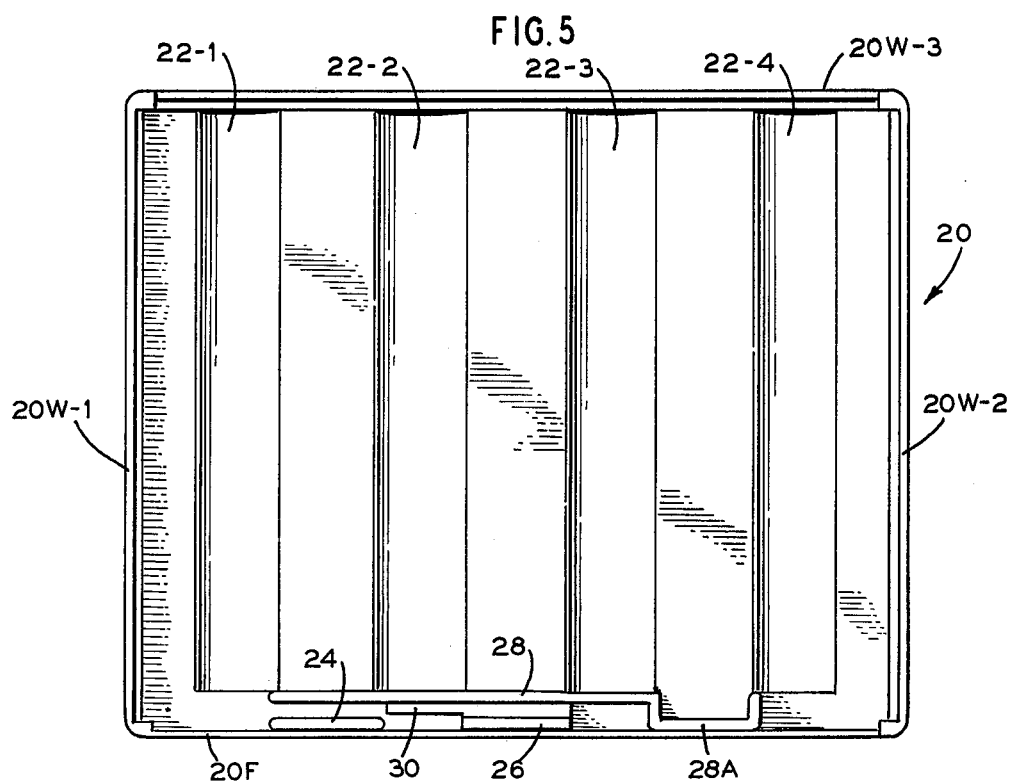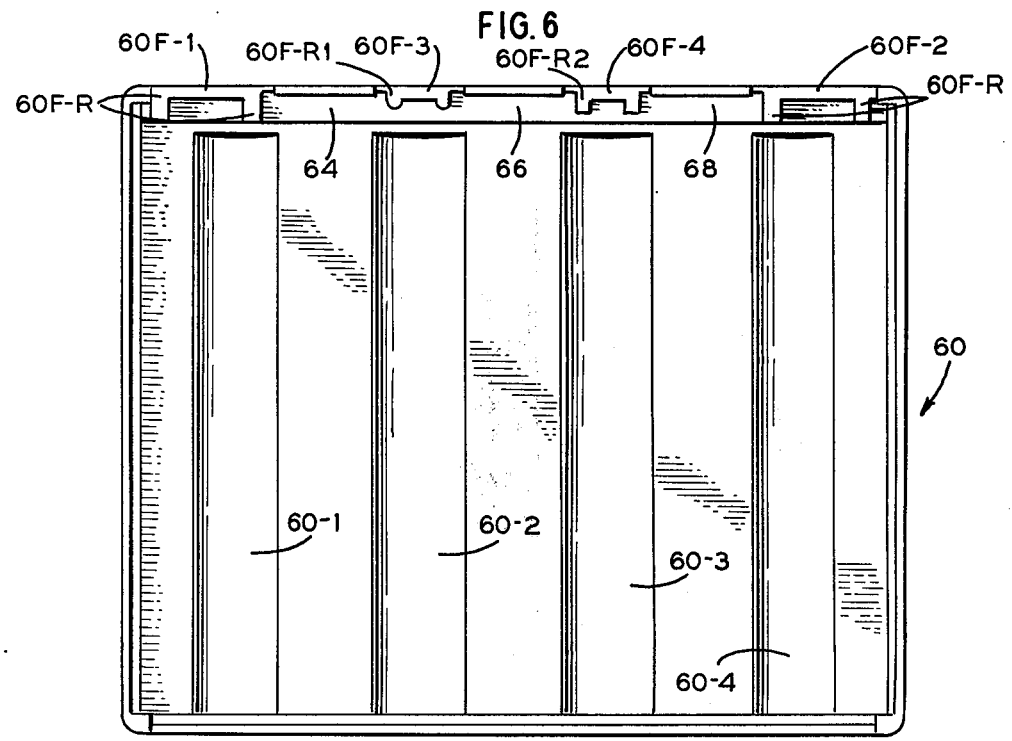

BATTERY AND CASE FOR APPLICATION IN RANDOM MODE TO SUPPLY PROPER POLARITY TO APPARATUS TO BE ENERGIZED

This invention relates to batteries, and particularly to battery packages or modules for use with electrically operated equipment, portable or nonportable.

It is particularly directed to a battery in a package or case which may be inserted at random in either of two modes into a receiving compartment, to connect the battery to the circuitry of its associated electrical apparatus or equipment, with proper and correct predetermined polarity connections, between the battery and the circuitry in the equipment, irrespective of the mode or manner in which the battery case was applied, or inserted into the equipment, that is whether the battery pack was inserted in a generally upright position, or in an inverted position.

In many portable electrical devices such as radios, cameras, pocket computers, and recorders, inserted batteries serve as the source of the necessary electrical power to operate the devices. When the batteries or cells are used up, it becomes necessary to replace them, and the problem then arises. If the battery cells are inserted individually, but are not inserted in proper polarity relationship, any battery cell that is not inserted in proper polarity relationship is necessarily short circuited, and will impose a load upon those cells which are connected in proper polarity relationship. In addition, a special hazard may be created if the cells are of modern type, including, for example, a lithium cell, which could, in such a situation, become fully depleted of its energy content with its voltage dropping to zero; and then the battery would tend to accept charge instead of being discharged, and the recharging could cause the generation of gases with the creation of high pressures within the cell structure, that could result in an explosion of the cell itself, and a consequent projection of the lithium materials to a distance where they might strike a human being in the neighborhood, and cause a severe injury.

In order to overcome this serious problem, of assuring proper polarity insertion, such small cells are now pre-packed in a package or case, in the correct circuit relationship, so that the battery of cells may be easily applied as a unit module to the equipment with which it is to be used. The problem of applying the battery case properly, however, still remains, for assuring proper polarity connection of the battery according to the requirements of the circuit in the equipment.

To solve the problem of proper polarity connection of the battery as applied to the equipment, the appropriate arrangements must be made in connection with the equipment and the battery case, to make sure that the battery will be properly inserted. Such arrangements have previously been made by constructing the equipment housing and the battery case so that the case must be inserted in a pre-arranged mode, in order that the terminals of the battery shall be properly applied to the stationary terminals in the equipment, with respect to their polarities.

In many cases the equipment to which the battery is to be applied, is made as small as possible, with the result that the receiving space or cavity for the battery case is necessarily limited. Consequently, pilot structures and guide strips on the equipment and on the battery case must also necessarily be limited in dimension. Moreover, for the sake of lightness in weight, the structures of the equipment and of the battery case are preferably made of a plastic material. While such plastic is sufficiently rigid to normally maintain its structural dimensions, it is not sufficiently strong to withstand deformation by pressure wedging forces that might possibly be developed to force a battery case into a predesigned cavity in the equipment, where tolerances are large enough to permit slight shifting of the case in wrong fitting relationship. Consequently, extra-excessive pressure could force a battery case into its receiving cavity, but in an improper mode, which would connect the battery to the circuitry of the equipment, in wrong polarity direction.

Thus, the problem is to be able to insert the battery package into its proper position to place the battery in proper polarity relationship with the circuitry of the equipment, without relying in any way on the intelligence and care of the user, who is changing the battery and inserting a new battery into the equipment.

A primary object of the invention is to provide a battery case designed and constructed so that it may be inserted into a related equipment without regard to the mode or manner of application of the battery case; that is, whether the case is inserted right-side up, or in an inverted condition.

Another object of the invention is to provide a design and construction of the battery case in relationship to the equipment with which it is to be used, such that the battery will be applied to the equipment in proper polarity relationship, irrespective of the manner in which the package or case is inserted into the space provided for the battery case in the equipment.

Another object of the invention is to provide a battery-containing case, for insertion into a related equipment, with the battery terminals disposed entirely within the contour limits of the containing case, and with the terminals of the battery so disposed within the case that proper polarity connections will be made with a pair of fixed terminals in the equipment to which the battery is to be applied, whether the battery package is inserted right side up or in an inverted mode.

For proper application and utility of the battery case that is within the scope of the subject of this invention, it is merely necessary to provide a proper receiving cavity or space for the battery case, with the terminals for the internal circuit of the equipment disposed as fixed terminals within that cavity, in appropriate positions to be engaged by the terminals of the battery as supported and contained within the battery case when inserted into the cavity.

By means of the construction of the battery case, in accordance with the principle of this invention, the proper polarity connections of the battery to the circuitry in the equipment, are assured.

Another object of the invention is that the assurance of proper polarity connections between the battery and the circuitry of the equipment, shall be achieved in the design and construction of the battery case, and that the only imposition on the equipment design shall be that the receiving terminals within the equipment shall be properly located, for engagement by the terminals in the battery case.

In accordance with the principles of this invention, the object of invention is achieved by providing a cavity space in an equipment to be serviced, to receive the battery case in directly applied motion, with two receiving terminals fixedly supported within the cavity of the receiving equipment, with one terminal disposed on the center-line axis of the cavity in the direction of movement of the inserted battery case, and the second receiving terminal disposed at a predetermined fixed distance from the center-line axis and from the fixed terminal on that axis, so that the correspondingly positioned two terminals of the battery in the battery case will engage the two receiving terminals, when the battery case is inserted into its receiving cavity.

On the battery case itself, a terminal of one polarity, for example, the negative polarity terminal, is disposed to bridge the center-line axis of the battery case, so that when the case is inserted into the equipment, the negative terminal within the battery case will engage the corresponding negative receiving terminal within the equipment.

Then, as the special feature of this invention, the positive terminal of the battery is formed to provide two lands, or contact areas, with one land disposed respectively on each side of the negative central contact terminal, and both lands are symmetrically spaced from the central area of said negative terminal. Consequently, when the battery case is inserted into the cavity of the equipment, one positive contact terminal land is always spaced from the center-line negative contact in proper position to be engaged, irrespective of the manner in which the battery case is inserted into its cavity. Consequently, when the battery case is inserted with its top side up, one of the two positive land areas will engage the positive receiving contact terminal in the equipment. If the battery case is inverted, when inserted, the other positive land area will then be in position to engage the positive stationary fixed contact in the receiving equipment.

Thus, by providing the positive contact with two land areas, symmetrically disposed on the opposite sides of the central negative contact, the battery package may be inserted, either in upright or in inverted position, into its receiving cavity in the equipment to be serviced by the battery, and the receiving terminals of the equipment will receive proper polarity from the battery in either position of the case.

In order to achieve this feature of the invention, the battery case is constructed to support the positive and negative terminals from the battery end cells, and such construction of the battery case is shown in more detail in the accompanying drawings, in which;

FIG. 1 is a schematic view showing an apparatus for receiving a battery case of this invention, with the battery case shown in two possible positions, as indicated by the bottom marking bar on the case, to illustrate how the proper polarity will be applied in either position of the battery case, upon insertion;

FIG. 2 is an exploded perspective view, of the front ends of the two half shells of the battery case, and of the two battery polarity terminals, that will be disposed within the contour outline of the battery case, and be accessible through windows at the end of the case, for engagement by the terminals of the apparatus with which the battery is to be used; with elements of FIG. 2 separately identified as FIG. 2-1 through FIG. 2-4.

FIG. 2 A-1 is a schematic plan view showing the ultimate cell arrangement in the battery case, and the manner in which the battery terminal strips are disposed at the front end of the case;

FIG. 2 A-2 is a perspective view, showing how the battery strip for one end cell is disposed and constructed, to provide one polarity of the battery;

FIG. 2 A-3 is a similar perspective view, showing how the other polarity strip of the battery is connected to the other end cell, and is constructed and shaped to fit into preformed supporting and spacing insulating posts at the front end of the case;

FIG. 3 is a perspective view of the battery case when closed and fully assembled, and shows the three windows at the front end of the case through which proper polarity areas on the internal battery polarity strips are accessible;

FIG. 4 shows a schematic view of the equipment into which the battery case is to be inserted, and illustrates the disposition of the terminals of the apparatus relative to the windows of the case in FIG. 3, to illustrate how the proper polarity will be provided to the apparatus, irrespective of the mode in which the battery case is inserted, that is, whether in the upright position as shown in FIG. 3 or in the inverted position as implied in the showing of FIG. 1;

FIG. 5 is a plan view of the bottom half shell of the battery case; and

FIG. 6 is an inside plan view of the top half shell of the battery case.

As already suggested, the invention is generally directed to providing a system assembly and cooperative design arrangement, between an apparatus to be serviced by a battery and the battery case to be inserted in the apparatus, with provision made to provide proper predetermined polarity to the terminals of the apparatus, irrespective of the mode of insertion of the battery case, so that proper polarity conditions will be established without requiring the battery case to be inserted in one specific predetermined mode.

Figure 1:
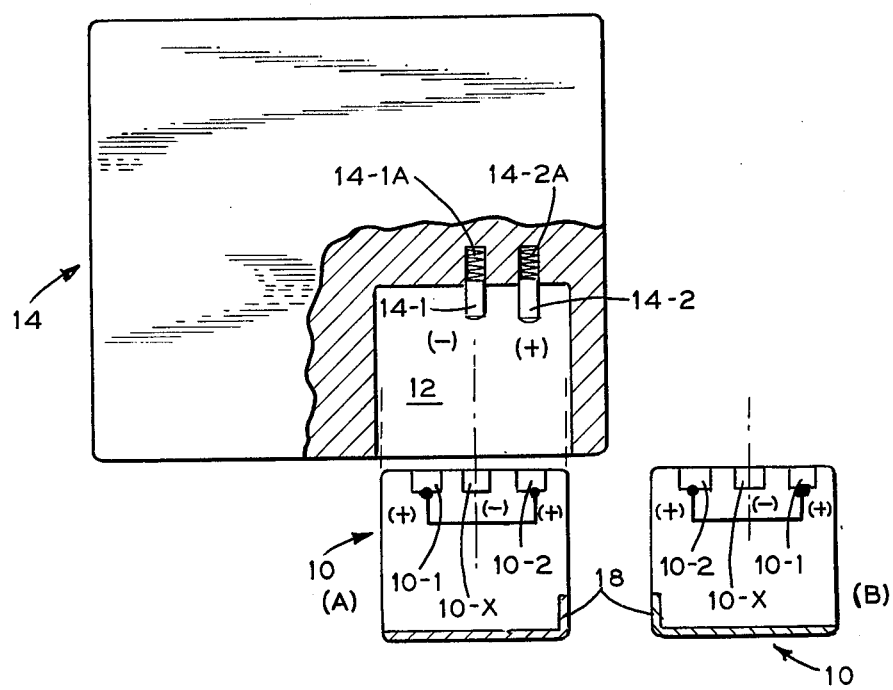

As shown in FIG. 1, a battery cartridge including cells enclosed in a case 10 is constructed of appropriate dimensions to fit into a receiving cavity or chamber 12 in an apparatus 14, which is to be served by the battery to energize and to operate circuitry and electrical elements contained within the apparatus 14. Such apparatus 14 may be a portable radio, or computer, or camera, each of which may have its own particular type of circuitry and electrically operable elements, or components, within the apparatus. Where the energy is needed solely to operate an electromagnet, for example, the matter of polarity is not generally a matter of concern. However, where the internal elements of the apparatus may contain circuits including polarity-sensitive elements or components, such as transistors, it becomes important and essential that the applied battery be applied to the apparatus with the proper polarity connections.

To illustrate the basic feature and ultimate purpose of the invention, the battery case 10 is shown in FIG. 1, in both arrangements that are possible. Thus, in FIG. 1, the case as indicated in position 10 (A) may be considered to be the normal or upright position of the case, and the case as shown in the sub figure (B) shows the case in inverted mode as indicated by the bottom shaded index line 18.

When the case 10 is inserted in the upright position of sub figure (A), in FIG. 1, the positive terminal 10-1 will not engage anything, but the other positive end of that same strip, identified as 10-2, will engage the positive terminal 14-2 of the apparatus 14. At the same time, the middle contact 10-X, representing the negative terminal of the battery, will engage the contact terminal 14-1 of the apparatus 14. Thus, proper polarity will be applied to the terminals 14-1 and 14-2, whose polarities are indicated to be, respectively, negative and positive.

If, because of the permitted random insertion of the battery case, the case 10 should be inserted in the inverted position, as shown in the sub figure (B), of FIG. 1, the negative terminal 10-X of the battery will still be applied to the proper negative terminal 14-1, both of which are axially arranged, but this time the contact 10-1, which was not engaged in the other inserted condition, will now engage contact 14-2 to assure application of positive polarity to the positive terminal 14-2 of the apparatus. Thus, by the provision of the two positive terminal lands 10-1 and 10-2, symmetrically disposed at similar and equal distances from the central axis terminal 10-X, proper polarity will be applied to the two terminals in the receiving cavity of the apparatus 14, irrespective of the mode of application of the battery case 10, that is, whether in the upright mode as in figure (A), or in the inverted mode, as in the sub figure (B) of FIG. 1.

The battery case 10 together with the contained battery cells constitutes essentially a throw away item, when the cell energy is used up. For that reason, the battery case is made as economically and cheaply as possible, generally of a formed plastic material to assure economy of manufacture, while at the same time making the case strong enough due to its own inherent rigidity, to be able to function as a protective container for the cells of the battery.

In order to achieve such economy, while at the same time providing a case of appropriate mechanical strength, the case 10 is formed of two half-shells 20 and 60, that are, respectively, shallow trays of generally rectangular shape.

Figure 2:
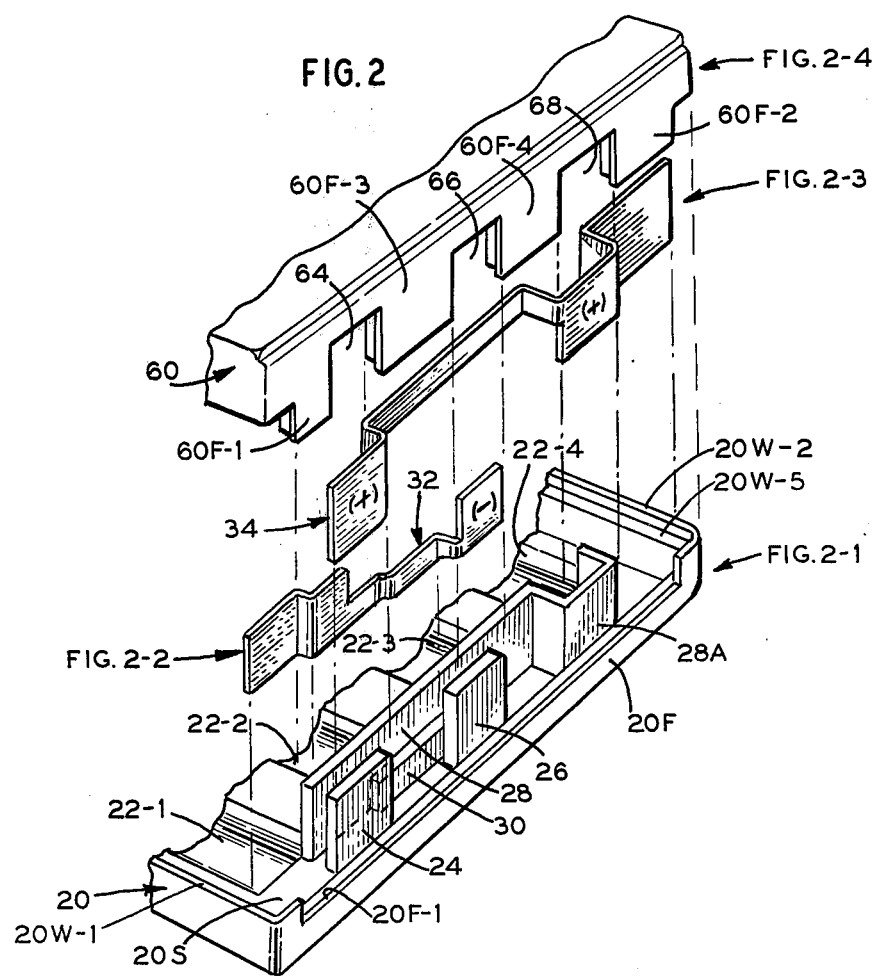

FIG. 2-1 shows the forward or front end portion of the bottom tray 20, and, as shown in that figure, and also in FIG. 5, later, tray 20 embodies several parallel flutes in its bottom inner surface to serve as seats to accommodate the respective cells, the number of flutes in this case being four and numbered from 22-1 through 22-4. In order to provide proper backing and reaction surface support for the polarity terminals of the ribbon strips that are connected to the end cells of the battery, the bottom tray 20, as shown in sub FIG. 2-1, of FIG. 2, is also provided with a first vertical post 24, a second vertical post 26, and a third vertical post 28 having an elongated structure and providing a vertical reaction structured element 28 A to accomplish one of its several functions, which will be explained in due course.

An additional insulating wall, serving as a spacer 30, is shown behind the two vertical posts 24 and 26, and in front of an elongated portion of the post 28.

In sub FIG. 2—2 of FIG. 2, is shown a conductive metallic strip 32, that serves as the negative terminal of the battery, and that is to be connected to one of the end cells. A second conductive metallic strip 34, in sub FIG. 2–3 of FIG. 2, serves as a positive terminal to be connected to the other end cell of the battery. The manner in which those two strips 32 and 34 are respectively arranged, will be explained in more detail in connection with the description of FIGS. 2A-2 and 2A-3.

Sub FIG. 2–4 of FIG. 2, shows a portion of the forward, or front, end of the top, or cover, tray 60, representing the top or cover part of the case 10. As shown in sub FIG. 2–4, the front end of the cover tray 60 embodies two depending side-end-wall portions 60F-1 and 60F-2, with two inner intermediate spaced depending front wall portions 60F-3 and 60F-4. Those four depending portions define three spaces between them, identified as 64, 66 and 68, respectively, which will be disposed and aligned directly in front of the three reaction bearing surfaces 24, 26 and 28A, respectively, in sub FIG. 2-1. Thus, the spaces 64, 66 and 68 in the upper tray 60 will serve as access windows through which the battery polarity strips 32 and 34 in sub FIGS. 2–2 and 2–3 may be engaged by receiving terminals 14-1 and 14-2 of the apparatus 14, shown in FIG. 1.

The manner in which the two polarity strips 32 and 34 of the battery are shaped, and disposed and supported on the case structure, may now be considered with reference to FIG. 2A-2, and to FIG. 2A-3.

As shown in FIG. 2A-2, the polarity strip 32 has an anchor plate 32-1, that is to be welded to the case of the battery cell 70-1, shown in FIG. 2A-1, and strip 32 then proceeds through a short forward bend portion 32-2 along the vertical edge 28-1, shown in FIG. 2A-3, then proceeds to a flat plate section 32-3 at rest against the front surface adjacent the vertical edge 28-1, thence to a short extension 32-4 and a short forward bend to 32-5 at the left-hand edge of insulating barrier post 30, and proceeds along the front face of barrier post 30 to the side wall edge 26-1 of the vertical post 26 that serves to support the negative terminal end shown as the termination plate 32-7 of the strip 32.

As an important design feature, those portions of the strip 32 which are numbered 32-4, 32-5 and 32-6 are cut down to slightly less than half of the height of the other panelled sections, 32-1, 32-3 and 32-7, since the two polar connecting strips 32 and 34, will cross over each other in the region of the insulating barrier 30, and must therefore be positioned and restrained against any short circuiting movement that would cause and permit the two strips to engage and short-circuit the battery. A provision for insulating the two polarity strips from each other, and the manner in which that is accomplished, will be clear upon reference now to FIG. 2A–3.

As shown in FIG. 2A–3, the positive polarity strip 34 is formed to be slipped directly into the receiving spaces for positioning and supporting the strip 34, as the positive terminal strip of the battery, to insulate strip 34 from its cooperating negative terminal strip 32 just described.

The positive terminal polarity strip 34 strip has its anchored end plate 34-7, positioned to be spot welded, as shown in FIG. 2A-1, to the central electrode of the end battery cell 70-4. The polarity strip 34 then proceeds through its several bends to the free end plate 34-1 that rests on the insulating reaction pressure post 24 to provide one area, or land, of contact, to be engaged by an external terminal for connection to the battery. The polarity strip 34 also embodies plate section 34-5 which seats on and against a reaction surface 28A of a portion of the insulating barrier 28, that is shown on the FIG. 2A–1 and FIG. 2A–3. Between those two plate sections 34-1 and 34-5 the polar strip 34 embodies a connecting portion including back bending elements 34-2, bridging element 34-3 and forward bending element 34-4, to connect the two contact making lands or areas 34-1 and 34-5. The bridging element 34-3 and the forward bending element 34-4 is undercut, and narrowed in depth, so it can rest on the top of the insulating post 30, in order to be kept out of any possible contact with the connecting elements 32-4, 32-5, and 32-6 of the other polar contact strip 32 of the battery.

That provision for separating the two contact strips 32 and 34 in the assembly, to prevent any possible contact and short circuiting between them, is necessary and is an important feature of this invention, since positive polarity strip 34 must overpass the negative polarity strip 32, in order to provide the two contact engaging lands or areas 34-1 and 34-5, for engaging the positive receiving terminal of the equipment 14.

FIG. 3 shows a perspective of the battery case when completed and assembled, and closed, and indicates the disposition of the windows in front of the accessible contact areas for the positive and the negative polarity terminals, of the battery, that correspond to those surfaces in FIGS. 2A-1 and 2A-3 that are designated as 34-1, 32-7, and 34-5. The two extreme outer surfaces representing the positive polarity of the battery, 34-1 and 34-5 in FIG. 2A-3, are identified here as 10-1 and 10-2, to correspond to the previous original designations in FIG. 1.

It will be observed that the two extreme outer positive terminal surface areas 34-1 and 34-5 are spaced equally distant, from the axial line, by the distance indicated D, and are therefore equi-distant from the central or negative terminal area 32-7. This is an important feature that permits the battery case 10 to be inserted to its associated equipment, at random, without requiring the case to be manipulated first to assure it will be inserted in some predetermined mode.

FIG. 4 shows, schematically, an equipment 14, in which the battery case is to be employed, and indicates by extension to FIG. 3 how the battery case of FIG. 3 is to be inserted into the cavity 12 of the equipment 14, with a negative contact surface area 32-7 and one positive contact surface area 34-5, in the shown disposition of the battery case 10, to engage the two terminals 14-1 and 14-2 of the apparatus 14 that is to be serviced by the battery.

When the battery case 10 is inserted into the cavity 12, proper polarity voltage from the battery will be applied to the receiving terminals 14-1 and 14-2 of the apparatus 14, as intended.

Similarly, if the battery case 10 is rotated to an upside-down position with respect to the position shown in FIG. 3, then, when the case is inserted into the cavity 12, the center or negative terminal surface 32-7, in battery case 10, will engage the same negative terminal 14-1 in the equipment, but, in this position of the case 10, the other positive terminal 10-1 indicated as surface 34-1, will now engage the positive terminal 14-2 in the equipment.

Thus, irrespective of the mode in which the battery case is inserted into the cavity 12, to provide the required voltage to the apparatus 14, the battery terminals will be properly connected to the receiving terminals of the apparatus 14, so that no improper application with respect to the polarity will occur.

With this construction of the battery case 10, and the corresponding construction of the apparatus 14, to receive the battery case 10, it is unnecessary to impose any physical guide restrictions on the battery case, or on the apparatus, for determining the manner in which the battery case must be applied and inserted. With the arrangement here shown, there is complete freedom in inserting the battery case, without any such imposition or requirement of predetermined mode insertion.

Thus, the construction of the battery case is simplified, and the application and insertion of the battery case into this apparatus is also simplified, and made easier, and time is saved, in cases particularly where it is desirable to make a quick change and a quick insertion of a battery, in order to obtain the operation immediately of the apparatus that is to be energized.

In the FIGS. 5 and 6 of the drawings, the constructions of the respective half-shells of the case are illustrated, to provide the structural features of the case that are illustrated schematically in the previous drawings and figures.

In FIG. 5 is shown a plan view of the bottom tray or half shell 20, which contains the four fluted areas for the batteries shown as flutes 22-1 through 22-4. Those flutes, also shown in FIG. 2—2, serve as seats for positioning the battery cells in slightly spaced lateral relation, without touching, as indicated generally in FIG. 2A-1. This view also shows the vertical posts 24 and 26 and the forward portion 28A of the barrier 28. The front surfaces of the post 24 and of 26 and of the section 28A, are all co-planar, and are disposed just within the outer contour of the front wall 20F of the case when closed. This view of the front end or front edge construction of this lower tray 20, also aids to show how the two strips in FIG. 2A-2 and in FIG. 2A-3 are disposed, to sit on and rest against the vertical posts 24, 26 and 28A. The two side walls 20W-1 and 20W-2, and the rear wall 20W-3, of the bottom tray or half shell 20, are provided with narrow inwardly projecting shoulders 20W-5 that serve as seats for receiving pilot strips along the edges of the side and rear walls of the upper cover half-shell 60, that is shown in FIG. 6. The case is thus practically mechanically closed when the two half shells are assembled, and the final sealing is then accomplished by applying a supersonic field to those adjacent and engaging wall edges, to bond the engaging edge surfaces.

In FIG. 6, the top or cover half-shell 60 is shown in plan, looking upward to the shell. Three window spaces 64, 66 and 68, are shown in the front wall of the cover half-shell 60, where they will be in direct alignment with the contact surfaces on the battery electrode elements in operating positions in the bottom tray, shown in FIG. 5. Between those three window spaces 64, 66 and 68, and on both sides of the two outer windows, are shown the depending elements previously referred to in FIG. 2, and now here similarly identified by the same numerals 60F-1, 60F-3, 60F-4 and 60F-2. The two outer end elements 60F-1 and 60F-2 are provided with reinforcing ribs 60F-R which serve the additional function of providing greater strength to the front end wall, in resisting the pressure of the spring bias forces from receiving terminals 14-1 and 14-2 of the apparatus 14 to be energized by the battery. Similarly, the two depending elements 60F-3 and 60F-4 are provided backwardly extending ribs 60F-R1 and 60F-R2, which serve not only as reinforcing ribs but also to extend back to the elements 30 and 28 respectively to receive the benefit of the reaction strength of those two elements 30 and 28, in holding the two trays of the box together as a relatively rigid unit so the front wall of the case will have a minimal of lost motion of deformation, when the case is pressed home in its cavity in the apparatus 14, with which it is to be used.

In order to permit the total case to be made as small as possible, as well as to limit the volumetric amount of material that will be needed for the case, the upper half shell 60 is also provided with flutes for receiving the battery cells, as indicated at 60-1 through 60-4.

As previously mentioned, when the cells are assembled in the bottom tray 20, the polarity terminal strips 32 and 34 are then inserted in position as shown in FIGS. 2A-1, 2A-2 and 2A-3, which will place those terminal strips in position where they may be engaged at the front end of the bottom tray to permit a spot welding operation, as indicated in FIG. 2A-1, on the two end cells 70-1 and 70-4, between the polarity end plates 32-1 and 34-7, respectively. To permit that simple welding operation to be achieved and effected, after the cells are assembled in the bottom tray, the front wall of the botton tray is formed to be open substantially along the full length of that front wall, as indicated at 20-1, to permit access to the two end cell elements at the two ends of that opening in the front wall of the case. Thus, in the manufacturing operation, the bottom tray serves as a carrier for moving and handling the battery cells as steps in the manufacturing assembly, and for holding them in proper position while the spot welding operation is achieved, to weld the terminal strips to the cells.

It will be seen, now, upon reference to FIG. 1, and to FIGS. 3 and 4, that the case 10, when constructed and assembled in the manner taught herein, will serve as a battery package or module which may be inserted into the cavity 12 of the apparatus 14 which it is to energize, but without requiring that the case be selectively manipulated in order to be introduced and inserted into its cavity in any predetermined or prescribed mode.

With the contruction as taught herein, the battery case can be inserted into its cavity, in random mode, and the connections will automatically be properly made to apply proper polarity voltage of the battery onto the receiving terminals of the apparatus to be served.

It should be understood that various arrangements might be made in the disposition of the elements, and in change of dimensions, without departing from the spirit and scope of the invention, as defined in the claims.

I claim:

1. A battery cartridge comprising a case with an interior bounded in part by a wall having a succession of apertures therethrough, a first aperture in said succession being situated equidistant from second plural apertures in said succession, cell means disposed in said case interior and having first and second polar surfaces for providing a voltage difference therebetween, terminal means for said cartridge comprising a first terminal juxtaposed with said first aperture and second terminals juxtaposed individually with said second apertures, first electrically conductive means in said case interior for connecting said first terminal to said cell means first polar surface and second electrically conductive means in said case interior for connecting said second terminals in common to said cell means second polar surface.

2. The battery cartridge claimed in claim 1 wherein said cell means comprises a plurality of cells, said cell means first polar surface being defined by one of said cells and said cell means second polar surface being defined by another of said cells.

3. The battery cartridge claimed in claim 2 wherein said first and second polar surfaces are spaced further interiorly of said wall than said terminals, the entirety of said first and second electrically conductive means being disposed in such space between said polar surfaces and said terminals.

4. The battery cartridge claimed in claim 3 wherein said first and second polar surfaces are disposed in a first plane parallel to said wall and said terminals are disposed in a second plane parallel to said wall, said first and second electrically conductive means respectively comprising first and second strip members extending from said first plane to said second plane and being of respective configurations providing for electrically insulated overpassing of said first strip member by said second strip member.

5. The battery cartridge claimed in claim 4 wherein said first and second strip members include respective reduced extents, said second strip member reduced extent spacedly overpassing said first strip member reduced extent at a location adjacent said first aperture and one of said second apertures.

6. The battery cartridge claimed in claim 2 wherein said case is in parallelepiped form with said wall being elongate, said first aperture being disposed centrally in said wall and said second apertures being two in number and being equally longitudinally spaced on opposite sides of said first aperture.

7. The battery cartridge claimed in claim 2 wherein said case comprises first and second interfitting tray members, said wall being formed integrally with said first tray member, said second tray member having rigid means situated interiorly of said wall for supporting said terminal means and said first and second electrically conductive means against displacement interiorly in said case.

8. A battery cartridge comprising a case with an interior bounded in part by a wall having a succession of apertures therethrough, a first aperture in said succession being situated equidistant from second plural apertures in said succession, cell means disposed in said case interior and having first and second polar surfaces for providing a voltage difference therebetween, terminal means for said cartridge comprising a first terminal substantially aligned with said first aperture and second terminals substantially aligned individually with said second apertures, said first and second terminals disposed in substantially the same plane, first electrically conductive means in said case interior for connecting said first terminal to said cell means first polar surface and second electrically conductive means in said case interior for connecting said second terminals in common to said cell means second polar surface, said first and second electrically conductive means respectively comprising first and second strip members including respective reduced extents, said second strip member reduced extent electrically insulatively overpassing said first member reduced extent.

9. The battery cartridge claimed in claim 8 wherein said case comprises rigid means situated interiorly of said wall for supporting said terminal means and said first and second electrically conductive means against displacement interiorly in said case.

10. A battery cartridge comprising a case with an interior bounded in part by a wall having a succession of apertures therethrough, an axial aperture in said succession and second plural apertures in said succession situated equidistant from said axial aperture, cell means disposed in said case interior and having first and second polar surfaces for providing a voltage difference therebetween, terminal means for said cartridge a first terminal in said case interior and accessible through said axial aperture and second terminals in said case interior and accessible individually through said second apertures, first electrically conductive means in said case interior connecting said first terminal to said first polar surface of said cell means and second electrically conductive means in said case interior connecting said second terminals in common to said second polar surface of said cell means.

11. The battery cartridge claimed in claim 10 wherein said first and second electrically conductive means respectively comprise first and second strip members including respective reduced extents, said second strip member reduced extent electrically insulatively overpassing said first strip member reduced extent at a location adjacent one of said apertures and wherein said case comprises rigid means situated interiorly of said wall for supporting said terminal means and said first and second electrically conductive means against displacement interiorly in said case.

* * * * *